US008864568B2

(12) United States Patent
Mizue

(10) Patent No.: US 8,864,568 B2
(45) Date of Patent: Oct. 21, 2014

(54) GAMING MACHINE HAVING MULTIPLYING SYMBOL ABILITY

(75) Inventor: Hayato Mizue, Sagamihara (JP)

(73) Assignee: Konami Gaming, Inc., Las Vegas, NV (US)

(*) Notice: Subject to any disclaimer, the term of this patent is extended or adjusted under 35 U.S.C. 154(b) by 721 days.

(21) Appl. No.: 12/321,621

(22) Filed: Jan. 23, 2009

(65) Prior Publication Data

US 2010/0190542 A1 Jul. 29, 2010

(51) Int. Cl.

| | |
|---|---|
| ***A63F 13/00*** | (2014.01) |
| ***G07F 17/34*** | (2006.01) |
| ***G07F 17/32*** | (2006.01) |
| *A63F 3/00* | (2006.01) |

(52) U.S. Cl.

CPC ......... *G07F 17/34* (2013.01); *A63F 2003/0016* (2013.01); *G07F 17/326* (2013.01)

USPC ........................................................ 463/20

(58) Field of Classification Search

CPC .............. G07F 17/326; G07F 17/3262; G07F 17/3265; G07F 17/3267; G07F 17/3269; G07F 17/34; A63F 13/00; A63F 13/005; A63F 13/02; A63F 13/08; A63F 13/10; A63F 13/12; A63F 2003/00157; A63F 2003/0016; A63F 2003/00164; A63F 2003/00167; A63F 2003/0017

USPC ............ 463/16, 22, 20, 21; 273/138.1, 138.2, 273/139

See application file for complete search history.

(56) References Cited

U.S. PATENT DOCUMENTS

| | | | | |
|---|---|---|---|---|
| 4,570,934 | A * | 2/1986 | Smyth | 273/143 R |
| 5,018,737 | A * | 5/1991 | Okada | 273/143 R |
| 5,152,529 | A * | 10/1992 | Okada | 463/20 |
| 5,833,537 | A * | 11/1998 | Barrie | 463/21 |
| 6,004,207 | A | 12/1999 | Wilson, Jr. et al. | |
| 6,203,430 | B1 | 3/2001 | Walker et al. | |
| 6,857,958 | B2 * | 2/2005 | Osawa | 463/20 |
| 7,530,894 | B1 * | 5/2009 | Marks et al. | 463/20 |
| 7,753,773 | B2 * | 7/2010 | Baerlocher et al. | 463/20 |
| 7,762,884 | B2 * | 7/2010 | Okada | 463/20 |
| 7,850,520 | B2 * | 12/2010 | Yoshimi | 463/20 |
| 7,980,946 | B2 * | 7/2011 | Marks et al. | 463/20 |
| 8,002,625 | B2 * | 8/2011 | Maya | 463/20 |
| 8,137,183 | B2 * | 3/2012 | Kearns et al. | 463/20 |
| 2003/0027622 | A1 * | 2/2003 | Osawa | 463/20 |
| 2004/0023714 | A1 * | 2/2004 | Asdale | 463/22 |
| 2004/0048646 | A1 * | 3/2004 | Visocnik | 463/16 |

(Continued)

OTHER PUBLICATIONS

Australian Patent Office Documents for Application 2009200779 (dated 2010).*

*Primary Examiner* — Michele Fan

(74) *Attorney, Agent, or Firm* — Howard & Howard Attorneys PLLC

(57) ABSTRACT

The present invention is a gaming machine including a reel display, which is configured with a plurality of reel lines displaying a plurality of symbols arranged to rotate along the reel lines, a controller, which shows a substantially-stationary symbol on a reel line while the symbols are rotating along the reel line, an evaluator, which recognizes a pass of a symbol related to the substantially-stationary symbol by the substantially-stationary symbol on the reel line, and a processor, which changes a function of the substantially-stationary symbol when the evaluator detects the symbol related to the substantially-stationary symbol passing by the substantially-stationary symbol on the reel line.

35 Claims, 14 Drawing Sheets

(56) References Cited

U.S. PATENT DOCUMENTS

| | | | | |
|---|---|---|---|---|
| 2004/0048651 | A1* | 3/2004 | Vorias et al. | 463/20 |
| 2004/0072606 | A1* | 4/2004 | Majima et al. | 463/16 |
| 2004/0102236 | A1* | 5/2004 | Suda et al. | 463/16 |
| 2005/0043082 | A1* | 2/2005 | Peterson et al. | 463/20 |
| 2005/0043084 | A1* | 2/2005 | Inoue | 463/20 |
| 2005/0059476 | A1* | 3/2005 | Vancura | 463/20 |
| 2005/0101369 | A1* | 5/2005 | Meyer | 463/16 |
| 2005/0101373 | A1* | 5/2005 | Mierau et al. | 463/20 |
| 2005/0164774 | A1* | 7/2005 | Gauselmann | 463/20 |
| 2006/0046829 | A1* | 3/2006 | White | 463/20 |
| 2006/0068893 | A1* | 3/2006 | Jaffe et al. | 463/20 |
| 2006/0084498 | A1* | 4/2006 | Baerlocher et al. | 463/20 |
| 2006/0252486 | A1* | 11/2006 | Walker et al. | 463/16 |
| 2006/0287060 | A1* | 12/2006 | Yoshimi | 463/20 |
| 2007/0015565 | A1* | 1/2007 | Chan | 463/20 |
| 2007/0060246 | A1* | 3/2007 | Baerlocher et al. | 463/16 |
| 2008/0032771 | A1* | 2/2008 | Okada | 463/20 |
| 2008/0032773 | A1* | 2/2008 | Okada | 463/20 |
| 2008/0045305 | A1* | 2/2008 | Okada | 463/20 |
| 2008/0051181 | A1* | 2/2008 | Okada | 463/20 |
| 2008/0058064 | A1* | 3/2008 | Okada | 463/20 |
| 2008/0064464 | A1* | 3/2008 | Okada | 463/16 |
| 2008/0102924 | A1* | 5/2008 | Okada | 463/20 |
| 2008/0108414 | A1* | 5/2008 | Stevens et al. | 463/20 |
| 2008/0113735 | A1* | 5/2008 | Maya | 463/20 |
| 2008/0113742 | A1* | 5/2008 | Amos et al. | 463/20 |
| 2008/0167125 | A1* | 7/2008 | Dias Pires et al. | 463/31 |
| 2008/0287178 | A1* | 11/2008 | Berman et al. | 463/20 |
| 2008/0293478 | A1* | 11/2008 | Anderson et al. | 463/25 |
| 2009/0075717 | A1* | 3/2009 | Jaffe | 463/20 |
| 2009/0075722 | A1* | 3/2009 | Louie et al. | 463/20 |
| 2009/0117983 | A1* | 5/2009 | Visser | 463/20 |
| 2009/0131148 | A1* | 5/2009 | Loose et al. | 463/20 |
| 2009/0221351 | A1* | 9/2009 | Nakano | 463/20 |
| 2009/0221352 | A1* | 9/2009 | Nakano | 463/20 |
| 2009/0227328 | A1* | 9/2009 | Saito | 463/20 |
| 2010/0016061 | A1* | 1/2010 | Gomez et al. | 463/20 |
| 2010/0048284 | A1* | 2/2010 | Jaffe | 463/20 |
| 2010/0056246 | A1* | 3/2010 | Lai et al. | 463/20 |
| 2010/0062827 | A1* | 3/2010 | Hoffman et al. | 463/20 |
| 2010/0075737 | A1* | 3/2010 | Bluemel | 463/20 |
| 2010/0120510 | A1* | 5/2010 | Saito et al. | 463/20 |
| 2010/0124972 | A1* | 5/2010 | Rodgers et al. | 463/20 |
| 2010/0190543 | A1* | 7/2010 | Englman et al. | 463/20 |
| 2010/0197385 | A1* | 8/2010 | Aoki et al. | 463/27 |

* cited by examiner

GAMING MACHINE HAVING MULTIPLYING SYMBOL ABILITY

TECHNICAL FIELD

The present invention relates to a gaming machine for executing a slot game, which is installed in casinos, pachisuro slot machine parlors, etc.

BACKGROUND OF THE INVENTION

Now, generally many slot machines, which execute a reel game, are installed in casinos. In these slot machines, there are many machines, which execute a game including a primary game and a free spin game. Since the free spin game is usually carried out as a bonus game of the primary game, the free spin game is set up so that higher prizes may be paid to a player, and is positioned as a game, which further excites a player. The conventional free spin game is performed in a form just like a primary game, and it has the feature that a winning combination appears with high probability. However, the free spin game is insufficient as a position of a bonus game, and it does not excite players enough. Under such status, there had been a desire for an appearance of a primary game or a secondary game, such as a free spin game, which can excite players more.

There are US2004/0072606 as prior art references of the technical field to which the present invention belongs. In the prior art reference, a gaming machine, which executes a slot game, is disclosed. The gaming machine is provided with an apparatus for counting a predetermined symbol passing on a reel display, and a display section for displaying the number of the counted symbol on an upper side of each reel line. The prior art reference discloses an invention, which determines an award amount based on the counted number. Further, U.S. Pat. Nos. 6,004,207 and 6,203,430 disclose gaming machines that have a feature of counting the number of appearance of a predetermined symbol or the number of times that the symbol passed, and reflecting the number to a bonus amount etc. In addition, U.S. Pat. No. 5,018,737 discloses a gaming machine, which has a feature of decreasing a rotation speed of a reel.

SUMMARY OF THE INVENTION

One aspect of the present invention is a gaming machine including a reel display, which is configured with a plurality of reel lines displaying a plurality of symbols arranged to rotate along the reel lines, a controller, which shows a substantially-stationary symbol on a reel line while the symbols are rotating along the reel line, an evaluator, which recognizes a pass of a symbol related to the substantially-stationary symbol by the substantially-stationary symbol on the reel line, and a processor, which changes a function of the substantially-stationary symbol when the evaluator detects the symbol related to the substantially-stationary symbol passing by the substantially-stationary symbol on the reel line.

By having the above-mentioned structure, since a reel game formerly performed in general can be provided with new concept and a sense of value, the conventional reel game can be regenerated into a completely new game. Normally, “how it is possible to give players hope for winning a large prize amount” is an essential element for developing a game. This game can achieve the objective in the aspect of enhancing the expectation of players for a large payout each time the function of the substantially-stationary symbol improves by an unconventional way of presentation. Further, because the substantially-stationary symbol can accumulate an amplification function etc., the game may be set to exercise the functions all at once after a few games, thereby the game can be more exciting and the player can heat up more.

The processor may change the function of the substantially-stationary symbol when the evaluator detects the symbol related to the substantially-stationary symbol passing under the substantially-stationary symbol on the reel line.

The controller may lower a rotating rate of the reel lines. In the present invention, the function of the substantially-stationary symbol changes when the symbol related to the substantially-stationary symbol passes by the substantially-stationary symbol. However, in a case when the rotating rate of the reel is high, the symbol related to the substantially-stationary symbol passes by the substantially-stationary symbol for a number of times in a short period of time. In such a case, the function of the substantially-stationary symbol makes various changes in a short period of time, which may result in a problem that a player has a hard time understanding how the function is changing. By configuring the gaming machine with the above-mentioned structure, such a problem can be solved.

The substantially-stationary symbol may be the same as the symbol related to the substantially-stationary symbol. The changed function of the substantially-stationary symbol may be activated when a winning combination is configured from a plurality of symbols including the substantially-stationary symbol.

The processor may change the function of the substantially-stationary symbol to a function for increasing a number of a free spin game. The processor may change the function of the substantially-stationary symbol to a function for multiplying an amount of payout depending on the winning combination. The processor may change the function of the substantially-stationary symbol to a function for extending the substantially-stationary symbol along the reel line to payout an award. The processor may change the function of the substantially-stationary symbol to a function for awarding another prize besides a payout of the winning combination.

By having the above-mentioned structure in the gaming machine, the function of the substantially-stationary symbol can be changed to various types of functions. Therefore, a game with more variety can be provided.

The substantially-stationary symbol may be a wild symbol, a trigger symbol or a scatter symbol. The processor may change a visible graphic of the substantially-stationary symbol when changing the function.

Another aspect of the present invention is a gaming machine including a physical reel, which has a plurality of circumferential lines indicating a plurality of indicia, the physical reel being rotatable along an axis, a transmission display, which is capable of showing a part of the circumferential lines to outside the gaming machine, a controller, which shows a predetermined indicium on the transmission display along the circumferential line, rotates the physical reel and detects an indicium passing by the predetermined indicium, the indicium relating to the predetermined indicium and a processor, which amplifies an ability of the predetermined indicium when the controller detects the indicium passing by the predetermined indicium.

By having the above-mentioned structure, since a reel game formerly performed in general can be provided with new concept and a sense of value, the conventional reel game can be regenerated into a completely new game. Normally, “how it is possible to give players hope for winning a large prize amount” is an essential element for developing a game. This game can achieve an objective in an aspect of enhancing the expectation of players for a large payout each time the function of the substantially-stationary symbol improves by an unconventional way of presentation. Further, because the substantially-stationary symbol can accumulate an amplification function etc., the game may be set to exercise the functions all at once after a few games, thereby the game can be more exciting and the player can heat up more.

The processor may amplify the ability of the predetermined indicium when the controller detects the indicia passing under the predetermined indicium.

The controller may lower a rotating rate of the physical reel. In the present invention, the function of the substantially-stationary symbol changes when the symbol related to the substantially-stationary symbol passes by the substantially-stationary symbol. However, in a case when a rotating rate of the reel is high, the symbol related to the substantially-stationary symbol passes by the substantially-stationary symbol for a number of times in a short period of time. In such a case, the function of the substantially-stationary symbol makes various changes in a short period of time, which may result in a problem that a player has a hard time understanding how the function is changing. By configuring the gaming machine with the above-mentioned structure, such a problem can be solved.

The controller may randomly show a plurality of the predetermined indicium on the transmission display along the circumferential line. The controller may show the predetermined indicium on the transmission display while the physical reel is rotating, when the predetermined indicium on the physical reel start appearing through the transmission display. The controller may show the predetermined indicium on the transmission display when a winning combination configured with indicia including the predetermined indicium are arranged. The controller may show the predetermined indicium, which has passed under the transmission display. The controller may continuously show the predetermined indicium used at a previous game on the transmission display.

By having the above-mentioned structure in the gaming machine, the substantially-stationary symbol may be shown on the reel display in various means. Thereby, it is possible to provide the game, which is rich in variety.

Another aspect of the present invention is a method of implementing the gaming including the steps of rotating a plurality of symbols along a plurality of reel lines on a display, substantially holding a predetermined symbol on the display along the reel lines, recognizing a passing symbol by the substantially-held symbol along the reel lines and enhancing an ability of the substantially-held symbol after recognizing the passing symbol.

By having the above-mentioned structure, since a reel game formerly performed in general can be provided with new thought and a sense of value, the conventional reel game can be regenerated into a completely new game. Normally, "how it is possible to give players hope for winning a large prize amount" is an essential element for developing a game. This game can achieve the objective in an aspect of enhancing the expectation of players for a large payout each time the function of the substantially-stationary symbol is improved by an unconventional way of presentation. Further, because the substantially-stationary symbol can accumulate an amplification function etc., the game may be set to exercise the functions all at once after a few games, thereby the game can be more exciting and the player can heat up more.

The recognizing step may be the step of recognizing the passing symbol under the substantially-held symbol along the reel lines. The substantially-held symbol may be the same as the passing symbol. The enhanced ability of the substantially-held symbol may be activated when a winning combination is configured from a plurality of symbols including the substantially-held symbol.

The method may include the step of outputting a combination sound when the ability of the substantially-held symbol is amplified. The method may include the step of restoring an initial state of the enhanced ability of the substantially-held symbol after the ability has been activated.

DETAILED DESCRIPTION OF INVENTION

Figure 1:
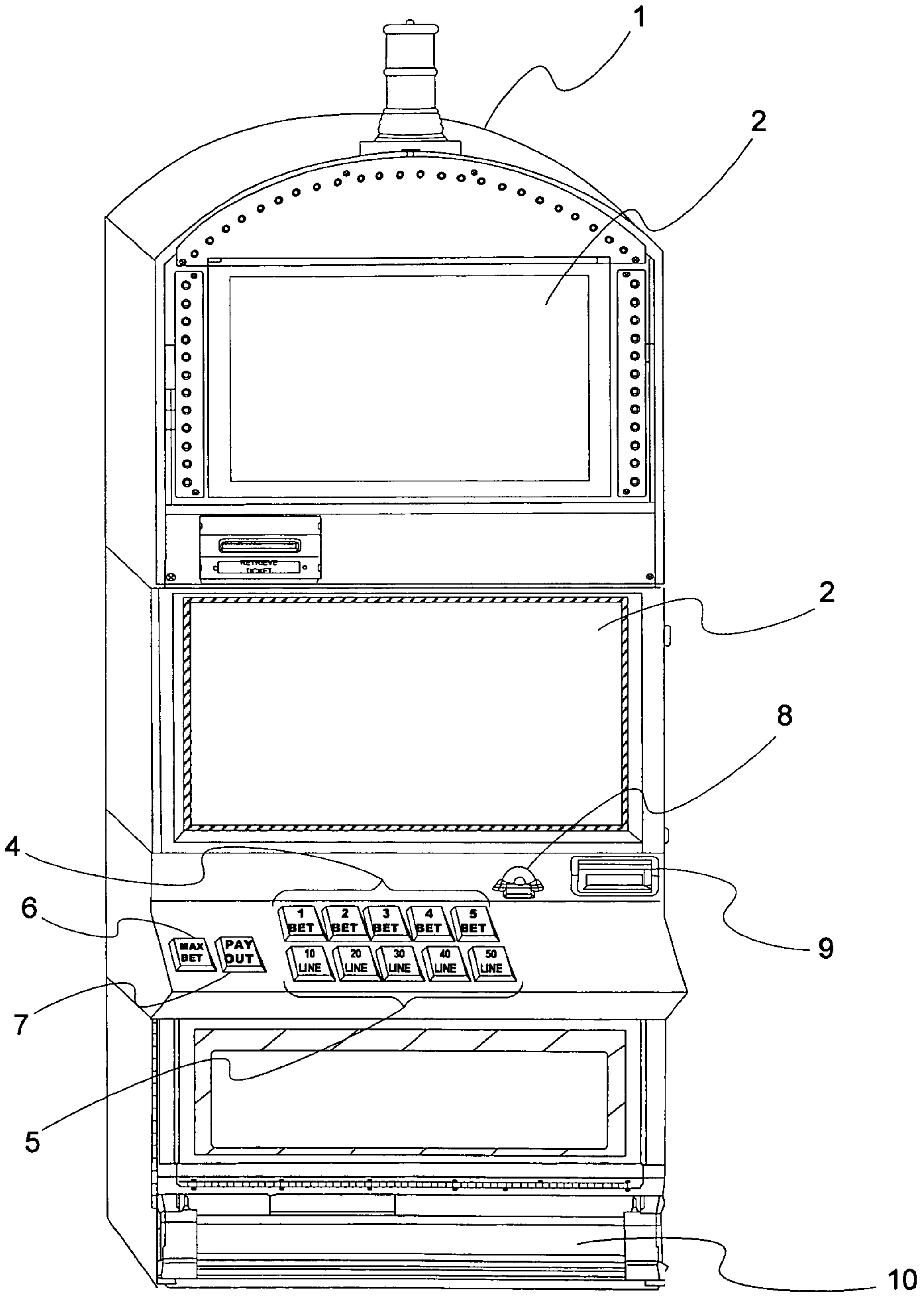
FIG. 1 is a perspective view illustrating an example of a gaming machine of the present invention.

FIG. 1 is a perspective view showing an example of a gaming machine of the present invention. As shown in FIG. 1, a gaming machine 1 is provided with two displays 2. Immediately under the displays 2, there are provided BET switches 4, selection switches 5, a MAXBET switch 6, a PAYOUT switch 7, a coin slot 8 and a bill acceptor 9. The BET switches 4 include five switches from 1BET to 5BET. The selection switches 5 include five switches from 1 (one) select to 5 (five) selects. A coin payout mouth 10 is provided in the lower part of gaming machine 1.

An indication required by a player to play a game is displayed on the displays 2. For example, the indication for performing a primary game or a secondary game is displayed on the displays 2. For example, cards used by a card game, roulette used in a roulette game, coins and a reel used in a reel game, a feature, etc. are displayed on displays 2. Also displayed on the displays 2 are an indication for a player to select a kind of a progressive game or a bonus game, and an indication for a player to select a feature. A progressive screen etc., which displays the amount of money that a player can obtain, may be displayed on the displays 2. The direction that corresponds to a progress status of a game, a credit that a player feeds into a gaming machine, and play history of the player may be displayed on display 2.

The BET switches 4 are switches for inputting a bet against the game. The player can input a bet from 1BET to 5BET using the BET switches for a game at a time. The selection switches 5 are switches for, for example, selecting a line on a reel and a card, which a player wants to discard, etc. The number of BET switches 4 and selection switches 5 may not be limited to five, but may be any number. The gaming machine 1 may have a switch for casting 10BET, for example, and may have a switch of 10select.

The MAXBET switch 6 is a switch for inputting the maximum bet that a player can spend against one time of a game. The PAYOUT switch 7 is a switch for rewarding a player with the amount of money, which has been credited onto the gaming machine. The coin slot 8 is a hole for a player to perform the credit of the coin to the gaming machine. The bill acceptor 9 is a hole used in order to feed a bill or a cash card into the gaming machine, or in order to repay the amount of money, which has been credited. The coin tray mouth 10 is a tray to reward a player with the amount of money, which has been credited in the gaming machine.

A gaming machine related to the present invention is not limited to the above, but it may have other various functions, and the above-mentioned function may be omitted. For example, the gaming machine may have a lighting apparatus for lighting a gaming machine using a color or a plurality of colors when a player proceeds onto the secondary game by having the gaming machine turn on the lighting apparatus. The gaming machine may have an apparatus for outputting music or an apparatus, which vibrates the whole gaming machine, when a player proceeds onto a secondary game. The gaming machine 1 may have three or more displays. The gaming machine 1 may have a switch for choosing the BET, which a player applied in the last game again.

A reel, roulette, etc., which are used in the game, do not need to be displayed on the display. A stepper (mechanical reel), mechanical roulette, etc. may be mounted in gaming machine 1. There may be a display etc., which is used in a plurality of gaming machines in common.

Next, a game form, which is executed by a gaming machine of the present invention, will be explained. To explain an outline of the game form, the game is normally a reel game (slot game), and is executed by rotating a plurality of symbols along a plurality of reel lines shown on a reel display. In the present invention, first, any symbol rotating along this reel line is indicated on the real display in a stationary state triggered by some sort of conditions. And, while the symbol is displayed on the reel display in the stationary state, a plurality of other symbols rotates along the reel line as they normally rotate in a game. And the present invention is to change a function of the held symbol in a case when a symbol related to the substantially-stationary symbol passes by the substantially-stationary symbol.

In addition, one of the features of the present invention is to display a symbol in a stationary state on a reel display. However, the symbol does not need to be displayed in a state where the symbol is completely stopped. For example, the symbol may be presented on the display in a "state where the symbol is slightly moving but substantially stationary". The "state where the symbol is slightly moving but substantially stationary" in here can be referred to, for example, a state where the symbol is slightly vibrating but substantially stationary, a state where the symbol is moving in a circular motion centering on a certain position but substantially stationary, or a state where the symbol is making a random move centering on a certain position but substantially stationary.

Further, a "state where the symbol is making a relatively large movement but staying within a predetermined range" is also included in the "substantially stationary state" of the present invention. For example, even a state, in which the substantially-stationary symbol moves on the reel line shown on the display so as to contact a top and a bottom ends of the reel line, is included in the "substantially stationary state" because the symbol is staying within the predetermined range. Further, for example, even a state, in which the substantially-stationary symbol moves from one reel line to a different reel line with the elapse of the time, is included in the "substantially stationary state". This is because the symbol is stationary at a position for at least a short period of time even when the symbol moves to the different reel line. Further, even a state, in which the substantially-stationary symbol moves to a position other than on the reel line, is included in the "substantially stationary state".

Next, "the case where a symbol, which is related to a substantially-stationary symbol, passes by the substantially-stationary symbol" in the present invention will be explained in detail. Here, "by" is not the word specifically limited and, for example, may indicate any directions, such as an upper side, a lower side, or a side of the symbol shown on the display, viewed from a player who exists externally to the gaming machine. Further, for example, a distance between the related symbol and the substantially-stationary symbol is not specifically limited at the time when the related symbol passes by the substantially-stationary symbol, and even a relatively long distance may be included within the range of the word "by". Normally, in the present invention, the substantially-stationary symbol is displayed on the reel line and the reel rotates in a way that a plurality of symbols passes under the substantially-stationary symbol when viewed from a player. Therefore, normally, the symbol, which is passing under the substantially-stationary symbol, cannot be viewed from a player.

However, the position at in which the plurality of symbols rotates is not specifically limited as described above, and the rotating symbol may pass over the substantially-stationary symbol viewed from a player. Further, the game form may be designed so that the substantially-stationary symbol is a transparent type and the symbol passing under the substantially-stationary symbol can be viewed from a player. The game form of the present invention may be applied in a case when the reel line is a physical reel (stepper) or when the reel line is a video reel. Therefore, in the case when the video reel is used in the gaming machine, the substantially-stationary symbol can be set to the transparent type by processing image data in an arbitrary form. Further, in the case when the physical reel is used in the gaming machine, the substantially-stationary symbol can be set to a transparent type by using a transparent type display as the display 2 described above. In such a case, the transparent type display is used for an external surface of the gaming machine and a liquid crystal display etc. is used for the inside of the transparent type display. By using the transparent type display in a transparent state and a non-transparent state as the situation demands, the image shown in the display can be switched to a state, which can be seen from a player, and a state, which cannot be seen from the player. In addition, a transparent type liquid crystal display or a transparent type organic EL display etc. may be used as the transparent type display, for example.

The game form of the present invention is normally a slot game, thus in a case when the stepper is used, the game is normally executed by using a reel having a plurality of symbols and rotating the reel. However, a method for rotating the symbols is not specifically limited as long as the slot game can be executed. For example, the game may be designed such that the stepper reel is fixed and the symbols move on the fixed reel. In a case when the video reel is used, the game may be executed by displaying the image on the video reel just as it appears to the eyes of a player when the stepper described above is used.

The symbol to be stopped on the reel display may be any types of symbols and a game designer may arbitrarily select the types. For example, the substantially-stationary symbols may be any types of symbols, such as a wild symbol, a scatter symbol, a trigger symbol, a picture symbol, or a normal symbol. The number of the substantially-stationary symbol, which exists on one screen, may be in any number, and a plurality of substantially-stationary symbols may be displayed on different reel lines or the same reel line. In addition, the types of the substantially-stationary symbol, which exists in one display, are not limited to one type and two or more different types of symbols may be used on one display as the substantially-stationary symbol.

A means for displaying the substantially-stationary symbol on the reel display is not specifically limited. For example, in the game form, the symbol moves so as to rotate along the reel line. However, only arbitrary symbols are picked up among all the symbols appeared on the reel display, and the picked symbols may be used as the substantially-stationary symbols. When picking up the symbols, the arbitrary symbols may randomly be picked up, or the arbitrary symbol may be picked up orderly. Further, for example, a predetermined symbol may be displayed randomly or orderly on the reel line as a substantially-stationary symbol with no relation to whether the symbols appear on the reel display or not. Further, for example, in a case when a winning combination is completed on the pay line, an arbitrary symbol among the symbols forming the winning combination may be displayed as a substantially-stationary symbol. Further, for example, a symbol that appeared on the reel display for the first time is picked up and the picked symbol may be used as a substantially-stationary symbol. In a case when the video reel is used, an arbitrary symbol having a low probability of appearing on the display is to have been made in advance and a configuration may be designed to pick up the prepared symbol as the substantially-stationary symbol when the prepared symbol appears for the first time. Further, in a case when the game form is developed over a plurality of steps, a substantially-stationary symbol, which was used in a step executed in the past, may be continuously shown on the display as the substantially-stationary symbol.

In addition, the period for continuously showing the substantially-stationary symbol is not specifically limited. Normally, the game is deployed by dividing it into a primary game and a secondary game. However, the period may be while the secondary game is executed once or while the primary game is executed once. Further, the game may be designed such that an additional game stage is included in the game other than the primary game and the secondary game, and the substantially-stationary symbol may be displayed continuously during the game stage. In addition, the type of the secondary game deployed in the present invention is not specifically limited, and the secondary game may be a free spin game etc. For example, a progressive game, or a wheel game etc. can be considered as the secondary game executed in the present invention other than those described above. These games may also be combined as the secondary game executed in the present invention other than those described above.

The trigger to show the substantially-stationary symbol on the display may be anything, and the timing for displaying the substantially-stationary symbol may be determined based on a condition arbitrarily determined by a game designer. For example, the trigger may be a start of a secondary game, or a completion of a predetermined combination on the pay line etc.

Meanwhile, the related symbol passing by the substantially-stationary symbol may be any types of symbols, and a game designer may arbitrarily determine the type. The related symbol may be, for example, the same symbol or the same type of the symbol as the substantially-stationary symbol. For example, in a case when the substantially-stationary symbol is a wild symbol, the related symbol may be the wild symbol. Therefore, in this case, the function of the substantially-stationary symbol may be set to change each time the wild symbol passes by the substantially-stationary symbol (wild symbol). Further, for example, the related symbol may be a symbol, which belongs to the same group as the substantially-stationary symbol, or a symbol having the same attribute as the substantially-stationary symbol. For example, in a case when the substantially-stationary symbol is a symbol "10", the related symbol may be a symbol of number, such as "5", and there is an association of "number". Further, for example, in a case when the substantially-stationary symbol is a symbol "A", the related symbol may be a symbol of alphabet, such as "K". In this case, there is an association of "alphabet". Further, this association may be arbitrarily determined by a game designer. It does not need to be able to group in a specific category, such as "number" or alphabet". For example, even when two symbols do not seem to have an association that are randomly selected from a plurality of types of symbols, those two symbols may be made to have an association in the present invention.

Further, "changing the function of the substantially-stationary symbols" in the present invention is not specifically limited a certain function. In case when the related symbols pass by the substantially-stationary symbol, the game may be set so that the substantially-stationary symbol may have any functions. Normally, the function of the substantially-stationary symbol changes in a way so that the benefit for a player improves. For example, the number of game that can be played may be increased, an amount of prize to be paid out to a player may be increased, or another prize that is different from a normal payout may further be made. Here, the "another prize" may be money or a credit etc., a gift certificate, a coupon, a complimentary ticket, or a meal voucher.

As a concrete example of the improvement in the function of the substantially-stationary symbol, for example, the "multiply" of the substantially-stationary symbol may increase from "X 2" to "X 3" each time the related symbol passes by the substantially-stationary symbol. The number of free spin that can be played or an amount to be paid out to a play may be increased according to the level of the "multiply". Namely, for example, in a case when a player qualifies to play free spin for ten times, the free spin may be executed for the total of thirty times when the level of "multiply" is "X 3". Further, in a case when the level of the "multiply" is "X 3", the amount of prize paid out to a player may be three times higher than the usual amount of prize to be paid out to the player. Further, the level of the award for progressive that can be obtained by a player may be increased. Meanwhile, the function of the substantially-stationary symbol may also be changed in a way that a disadvantage is given to a player each time the related symbol passes by the substantially-stationary symbol. For example, the function of the substantially-stationary symbol may be changed in a way that the amount of the prize that can be obtained by a player decreases etc. An example of changing the function of the substantially-stationary symbol is explained in detail in an embodiment described below.

The trigger and the timing for exercising the changed function of the substantially-stationary symbol may be anything. For example, the function may be exercised randomly without a specific limit on time or condition. For example, the function may be exercised in a case when the substantially-stationary symbol whose function was changed becomes a part of the symbol forming a winning combination. In such a case, when a winning combination, in which the substantially-stationary symbol whose function was changed is not a part of the winning combination, is completed, the game may be set so that the substantially-stationary symbol whose function was changed loses the changed function. Further, for example, the function may be exercised in a case when the above-mentioned “multiply” reaches to a predetermined value.

In a case when there is a plurality of substantially-stationary symbols in one display, the functions of the substantially-stationary symbols may be exercised in different timings instead of exercising those functions simultaneously. For example, the secondary game is normally performed continuously for a certain period of time. In such a case, each of the substantially-stationary symbols may exercise the function separately in a different timeframe while the secondary game is executed. Further, the substantially-stationary symbol whose function was changed may exercise the function after carrying the substantially-stationary symbol over to a next game without exercising the function in the current game. In a case when the substantially-stationary symbol is carried over to a next game, the function after the change may be used in the next game without being changed to other functions, or the changed function may be used in a next game after being returned to the original function.

In a case when the function of the substantially-stationary symbol is further changed, the visual effect of the substantially-stationary symbol shown on the display, such as a shape or color etc. may be changed. For example, in a case when the multiply of the substantially-stationary symbol is changed from “X 2” to “X 3”, the colors of the multiplies may be changed without changing their shapes. Further, in a case when the function of the substantially-stationary symbol is changed, the gaming machine may provide a sound or illuminations.

Further, in a case when there is a plurality of substantially-stationary symbols in one display and each of the substantially-stationary symbols has the “multiply”, those “multiplies” may be reflected to the development of the game by multiplying each other. For example, in a case when there are two substantially-stationary symbols having “X 2” in one display, the number of free spin may be increased to four times by combining those two “X 2” and making it to “X 4”. Further, in a case when applying this operating mode, only the “multiplies” of the substantially-stationary symbol forming a winning combination may be combined. For example, in a case when each of two substantially-stationary symbols forming a wining combination has “X 2” and the substantially-stationary symbols not forming the winning combination has “X 2”, those multiplies may be combined to “X 4”.

Further, the function of the substantially-stationary symbol changes in a case when a related symbol passes by the substantially-stationary symbol in the present invention. However, in case when the rotation speed of the reel is high, the related symbol passes by the substantially-stationary symbol a number of times in a short period of time. In such a case, the function of the substantially-stationary symbol makes numerous changes in the short period of time, which may leads to a problem in which a player has a hard time understanding how the function is changing. Therefore, when the game stage is in a state in which the function of the substantially-stationary symbol changes, it is favorable to decrease the rotating rate of the reel lower than a normal rate, or to provide a rotating rate to the extent that a player can understand a change.

Figure 2:
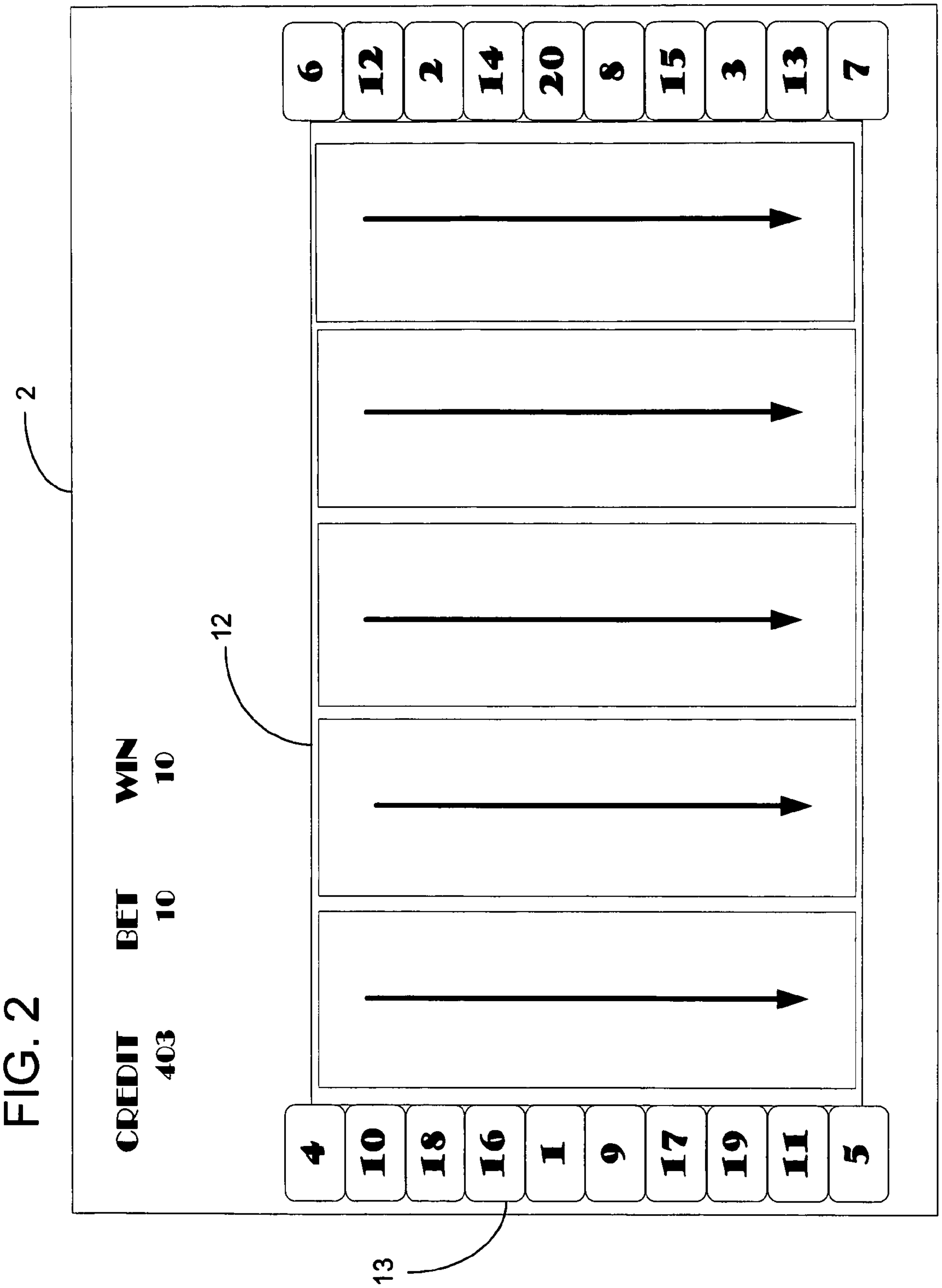
FIG. 2 is a diagram illustrating an aspect of a game executed by a gaming machine pertaining to the present invention.

A flow of a game pertaining to the present invention will be concretely explained. First, an embodiment of a game executed by a gaming machine pertaining to the present invention will be explained with reference to FIGS. 2 to 5. FIG. 2 illustrates a starting state of the game pertaining to the present invention. In the game pertaining to the present invention, first, a controller rotates reels. In FIG. 2, a reel display 12, and a display 2 showing a pay line 13 are illustrated. A condition where symbols are rotating along a plurality of reel lines on the reel display 12 is shown.

Figure 3:
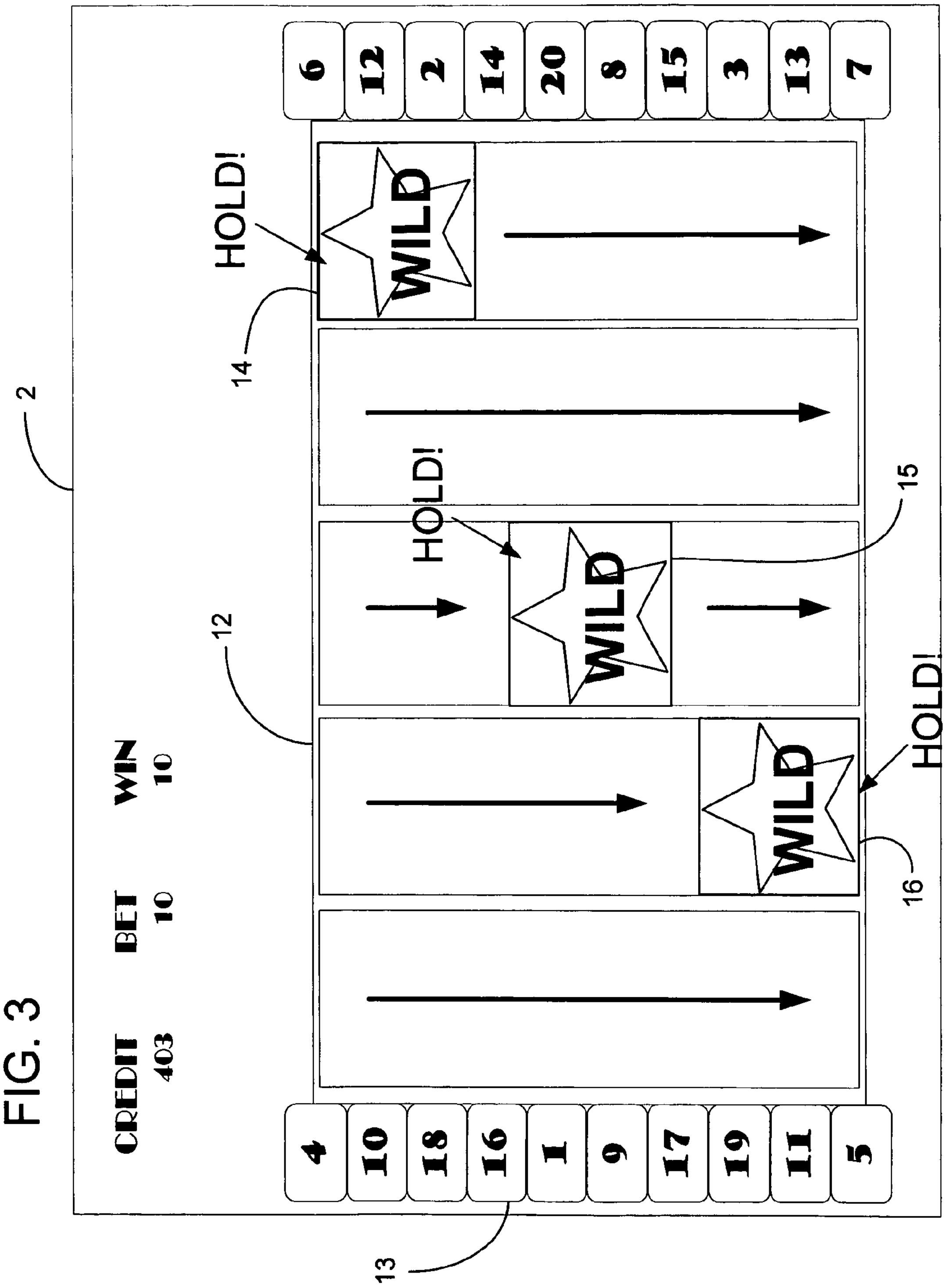
FIG. 3 is a diagram illustrating a state where a game situation shown in FIG. 2 is progressed further.

FIG. 3 illustrates a condition where the symbols are held on the reel line while the symbols are rotating along the plurality of reel lines. Here, the held symbols (also referred to as substantially-stationary symbols) are wild symbols. FIG. 3 is a state where the controller randomly picks up the wild symbols shown in the reel display 12, and the wild symbols are held on the display. As it can be understood from the figure, three wild symbols 14 to 16, which are on the first column, third column, and fourth column from the right, are held in one display.

Figure 4:
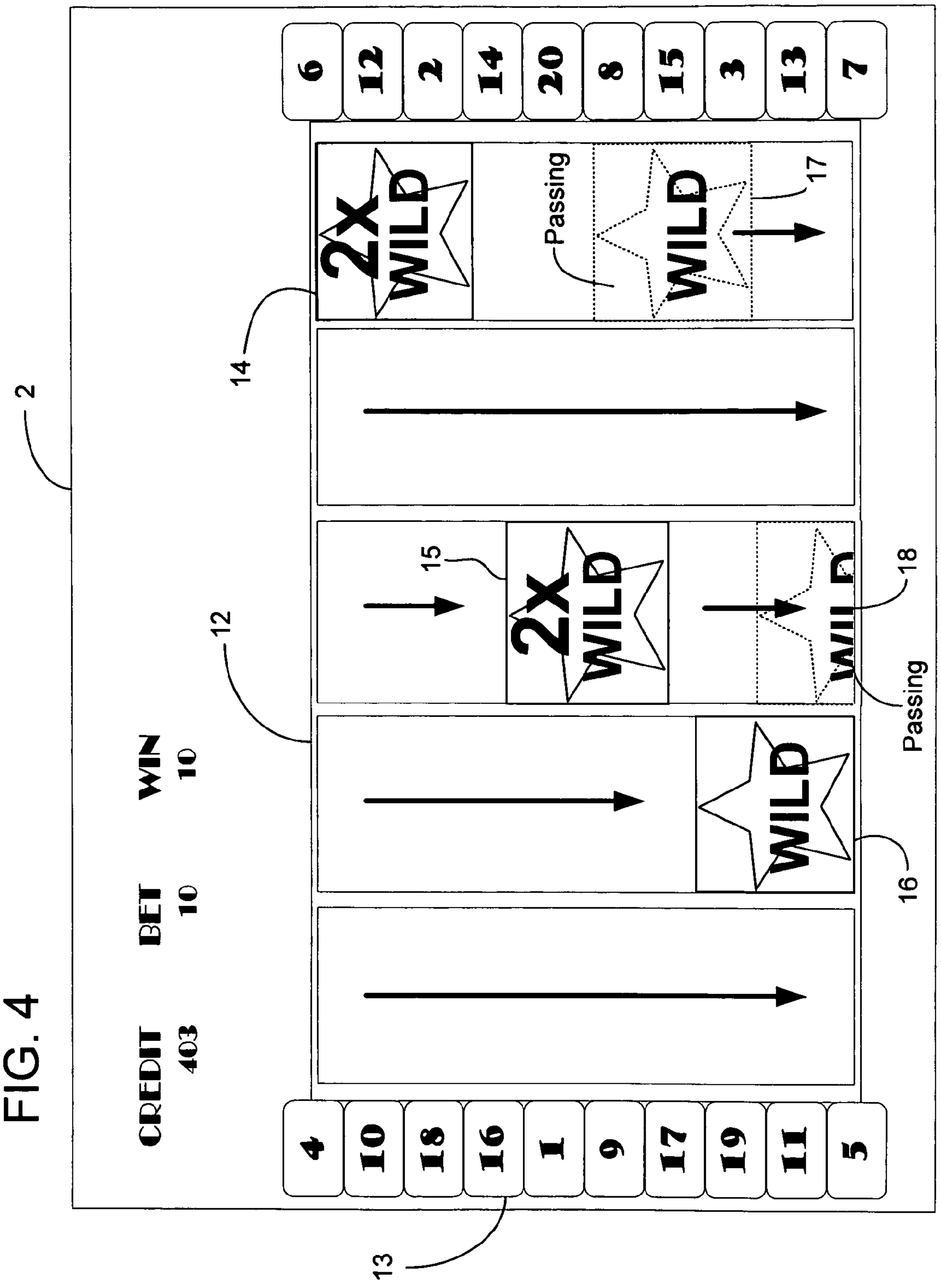
FIG. 4 is a diagram illustrating a state where a game situation shown in FIG. 3 is progressed further.

FIG. 4 is a diagram illustrating a condition where a game situation shown in FIG. 3 has progressed further. FIG. 4 illustrates a condition where a “multiply” on the wild symbol is increased when a wild symbol passes underneath the held wild symbol. The plurality of symbols continues to rotate on the reel line, and the wild symbols 17 and 18 passes underneath the substantially-stationary symbols 14 and 15 respectively. Because of this, the “multiplies” of the substantially-stationary symbols 14 and 15 change to “X 2”. Meanwhile, the “multiply” of the substantially-stationary symbol 16, which a wild symbol has not passed beneath, does not change.

Figure 5:
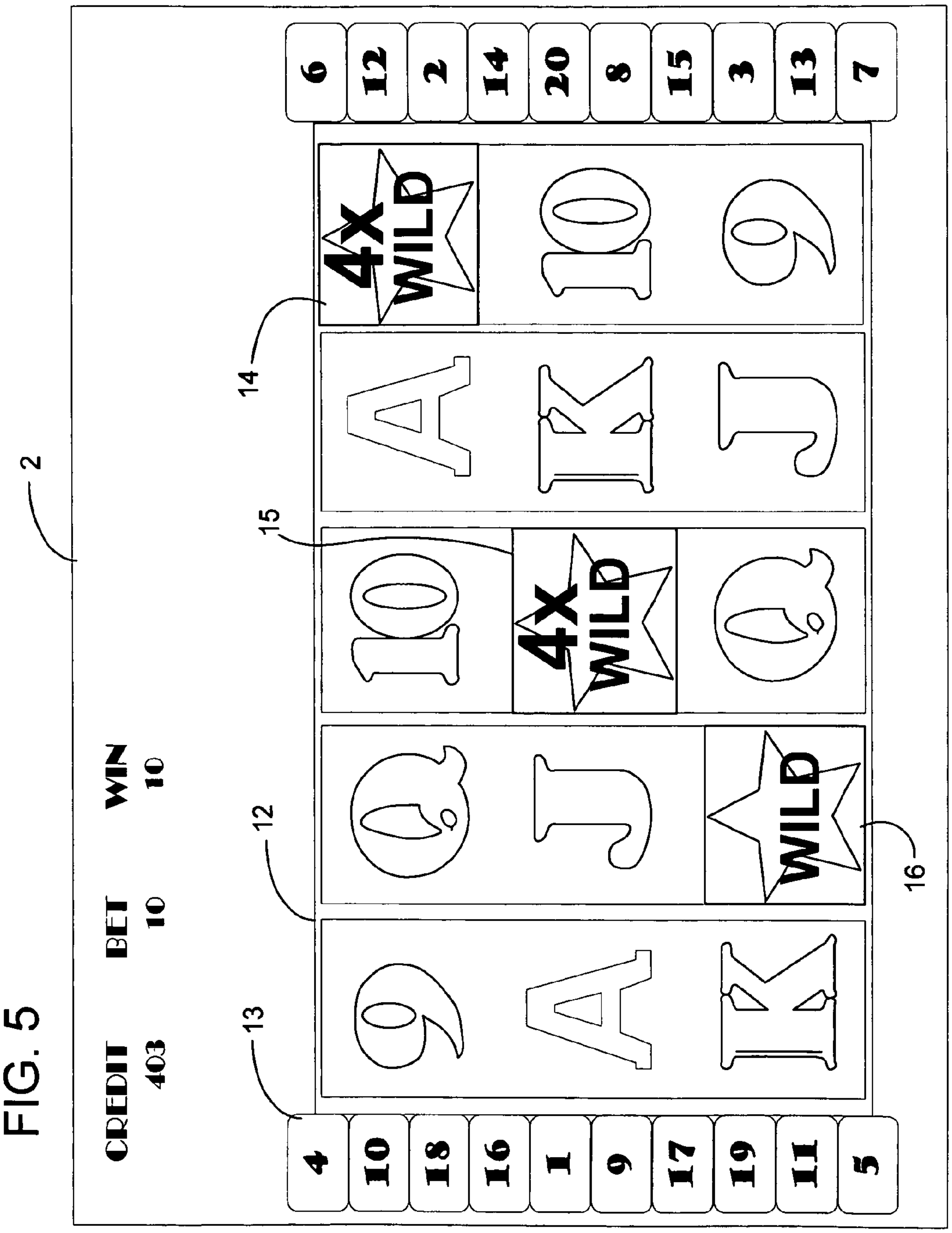
FIG. 5 is a diagram illustrating a state where a game situation shown in FIG. 4 is progressed further.

FIG. 5 is a diagram illustrating a condition where the game situation shown in FIG. 4 has progressed further. FIG. 5 illustrates a condition where the “multiplies” of the substantially-stationary symbols 14 and 15 change to “X 4” because the wild symbols passed underneath the substantially-stationary symbols 14 and 15 for 4 times each. In FIG. 5, the rotation of the reels is stopped. The plurality of symbols is shown on the plurality of the reel lines, and the substantially-stationary symbols 14 and 15 ultimately have “X 4”. In addition, there was no wild symbol, which passed underneath the substantially-stationary symbol 16, thus the “multiply” of the substantially-stationary symbol 16 does not change ultimately. Then, a determination for the number of free spin or determination of the payout amount is made according to the “multiply” on the substantially-stationary symbol, which was determined by the operations in FIGS. 2 to 5.

Figure 6:
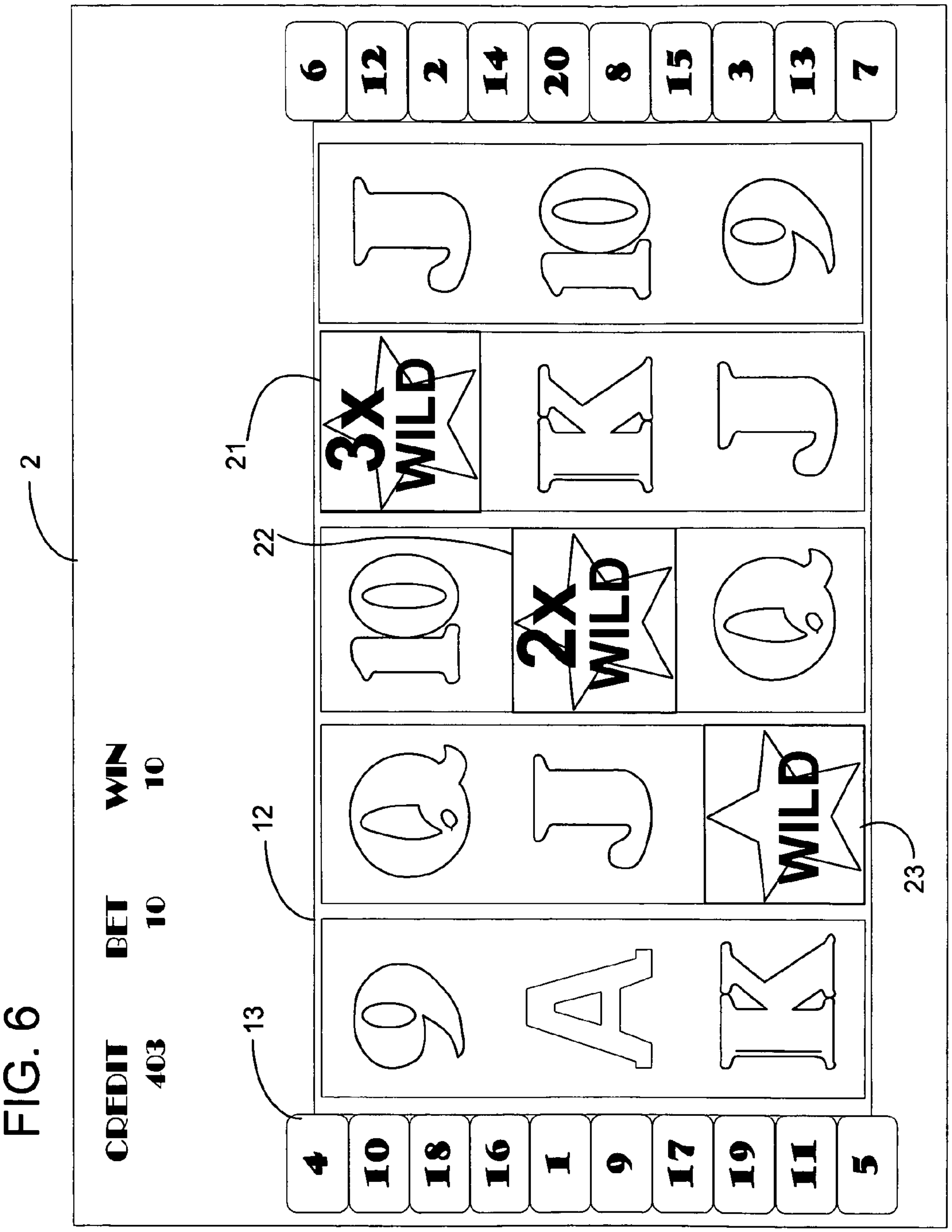
FIG. 6 is a diagram illustrating an aspect of a game executed by a gaming machine pertaining to the present invention.

Further, another embodiment of the game executed by the gaming machine pertaining to the present invention will be explained with reference to FIGS. 6 and 7. FIG. 6 illustrates a state where the “multiplies” of the substantially-stationary symbols 21 and 22 have been determined by the operations of FIGS. 2 to 4 described above. The “multiply” of the substantially-stationary symbol 21 is determined to be “X 3”, and the “multiply” of the substantially-stationary symbol 22 is determined to be “X 2”

Figure 7:
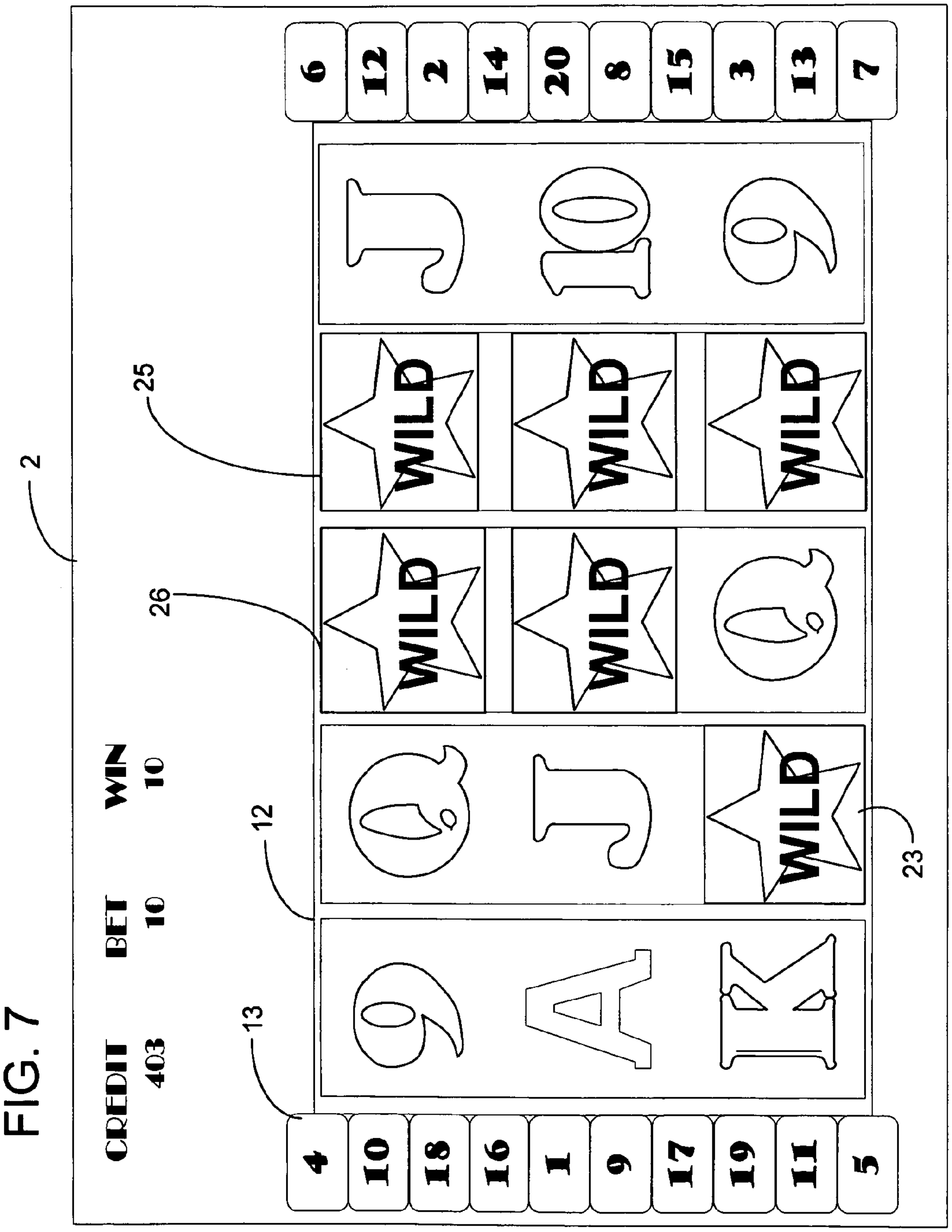
FIG. 7 is a diagram illustrating a state where a game situation shown in FIG. 6 is progressed further.

FIG. 7 is a diagram illustrating a state where the game situation shown in FIG. 6 has progressed further. In FIG. 7, there are three wild symbols along the reel line 25. This is because the wild symbol 21 shown in FIG. 6 had the “multiply" of "X 3" and the wild symbol 21 increased to three wild symbols 21 in FIG. 7. Similarly, because the wild symbol 22 had the "multiply" of "X 2" in FIG. 6, the wild symbol along the reel line 26 in FIG. 7 is increased to two wild symbols. In this way, the substantially-stationary symbol may increase in number along the reel line by the multiple of the number shown in the "multiply". Meanwhile, the number of the substantially-stationary symbol 23 does not increase because the substantially-stationary symbol 23 does not have "multiply".

In addition, the game form pertaining to the present invention is not limited to those described in FIGS. 2 to 7. For example, the position where the substantially-stationary symbol is held may be on any reel lines. Further, two or more substantially-stationary symbols may be displayed on one reel line and each of the substantially-stationary symbol may have the "multiply". Further, the function of the substantially-stationary symbol does not need to be the "multiply". For example, a credit amount is displayed on a substantially-stationary symbol and the credit amount may change by the passing of the related symbol. Further, for example, the types of the substantially-stationary symbol may change by the passing of the related symbol. Namely, for example, in a case when the substantially-stationary symbol is a normal symbol, the normal symbol may change to a wild symbol. Further, for example, the number of the substantially-stationary symbol may increase in a vertical line or a horizontal line by the passing of the related symbol.

Further, for example, the point displayed on the substantially-stationary symbol increases as the related symbol passes and the types of the progressive or the level given to a player may be ultimately determined according to the point. For example, instead of increasing the number of the substantially-stationary symbol by the passing of the related symbol, the substantially-stationary symbol may extend and exist on two or three cells on the reel line. Further, the way to extend the substantially-stationary symbol is not limited to a vertical extension along the reel line, and the substantially-stationary symbol may be extended across two or more reel lines. Further, the number of reel lines is not limited to five and may be in any number. Further, the number of the symbol shown on the reel line is not limited to three and may be in any number. Further, the number of the pay line is not specifically limited.

Figure 8:
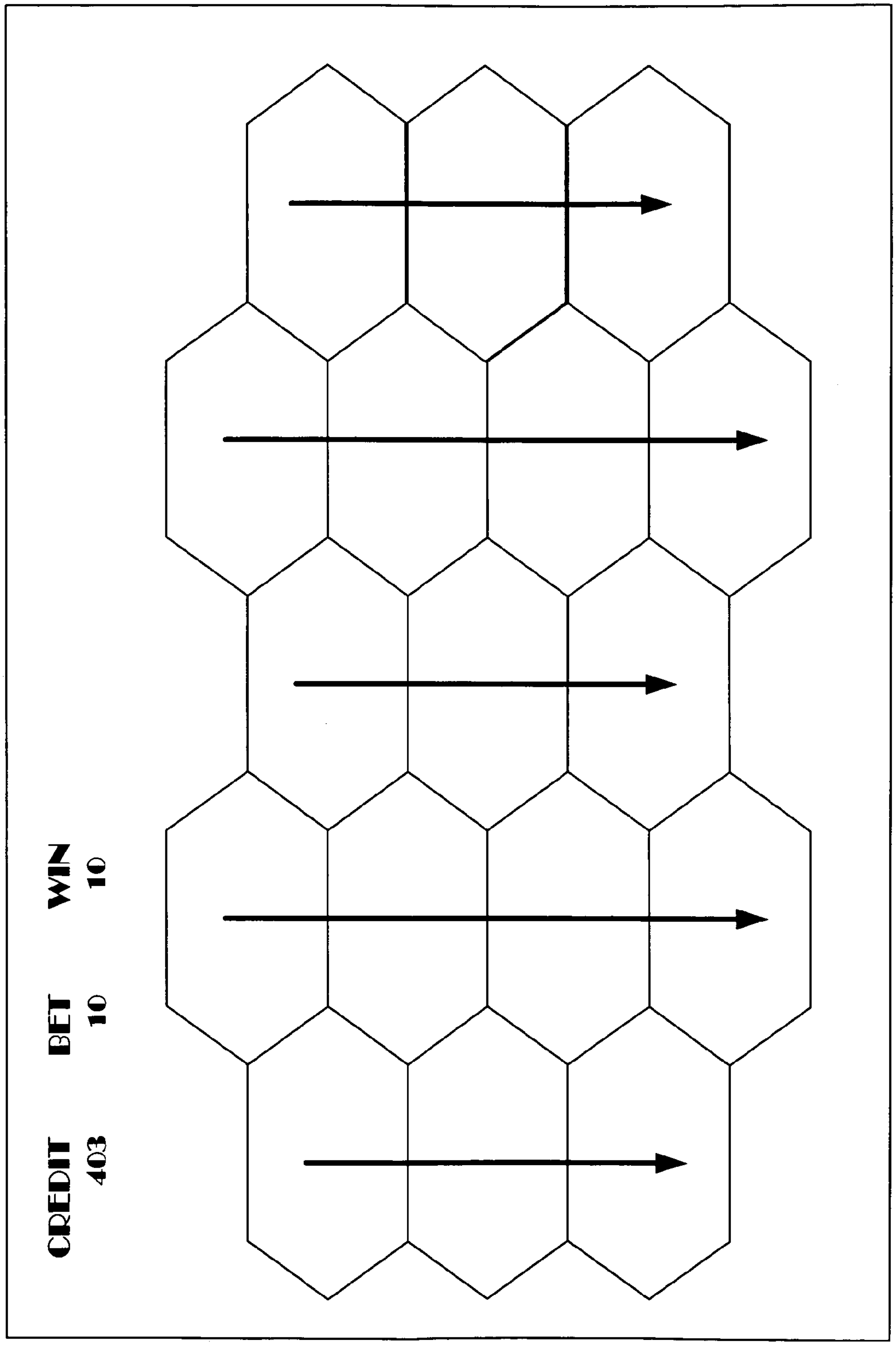
FIG. 8 is a diagram illustrating an aspect of a game executed by a gaming machine pertaining to the present invention.

Next, another embodiment of the game executed by the gaming machine pertaining to the present invention will be explained with reference to FIGS. 8 to 12. FIG. 8 illustrates an example of a starting state of a game pertaining to the present invention. In FIG. 8, a plurality of reel lines are formed from a plurality of hexagonal cells. The numbers of hexagonal cells forming each reel line are 3-4-3-4-3 from the left column. The number of hexagonal cells forming the reel line is not specifically limited. For example, the number of the hexagonal cells may be 4-5-4-5-4, 5-4-5-4-5, or 4-2-4-2-4 from the left column. The number of the reel lines formed from the hexagonal cell is not limited to five nor specifically limited. In FIG. 8, a game is started, and a plurality of symbols is moving on the reel lines.

Figure 9:
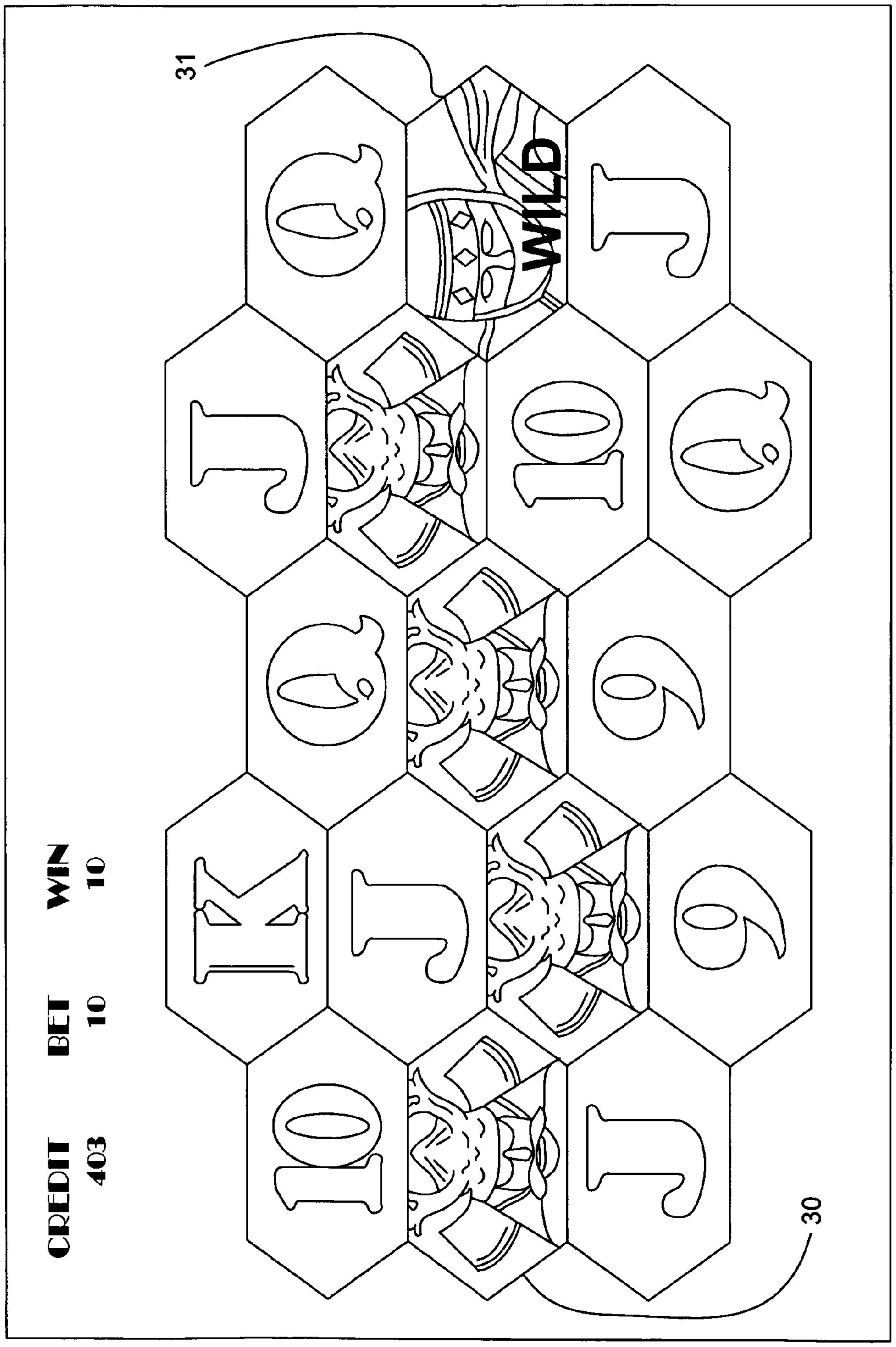
FIG. 9 is a diagram illustrating a state where a game situation shown in FIG. 8 is progressed further.

FIG. 9 is a diagram illustrating a state where the game situation shown in FIG. 8 has progressed further. FIG. 9 illustrates a state where a plurality of symbols are displayed on the reel lines by the reel stop after the reel rotates as shown in FIG. 8. On the middle of the reel lines in FIG. 9, a winning combination formed from the symbol 30 and the wild symbol 31 is displayed.

Figure 10:
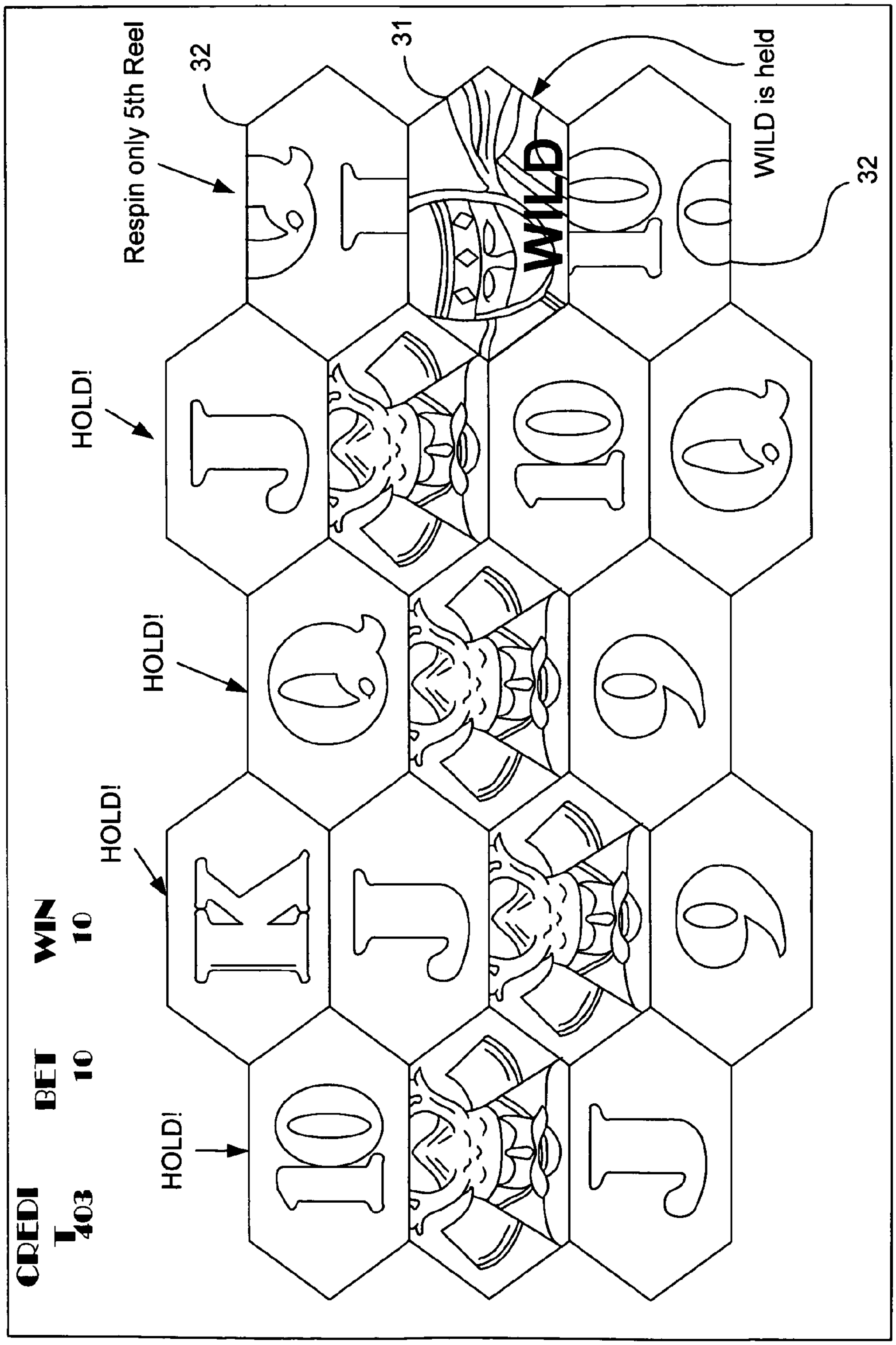
FIG. 10 is a diagram illustrating a state where a game situation shown in FIG. 9 is progressed further.

FIG. 10 is a diagram illustrating a state where the game situation shown in FIG. 9 has progressed further. In the case when the winning combination completes on the reel as shown in FIG. 9, the reel lines from the first column to the forth column from the left are fixed and only the reel of the fifth column starts to rotate. At this time, since the wild symbol 31 becomes substantially-stationary symbol, the wild symbol 31 is held while the reel of the fifth column rotates. Therefore, although the cell 32 displays in a way that various symbols are alternately rotating because the reel of the fifth column starts to rotate, the wild symbol 31 is displayed in a stationary state.

Figure 11:
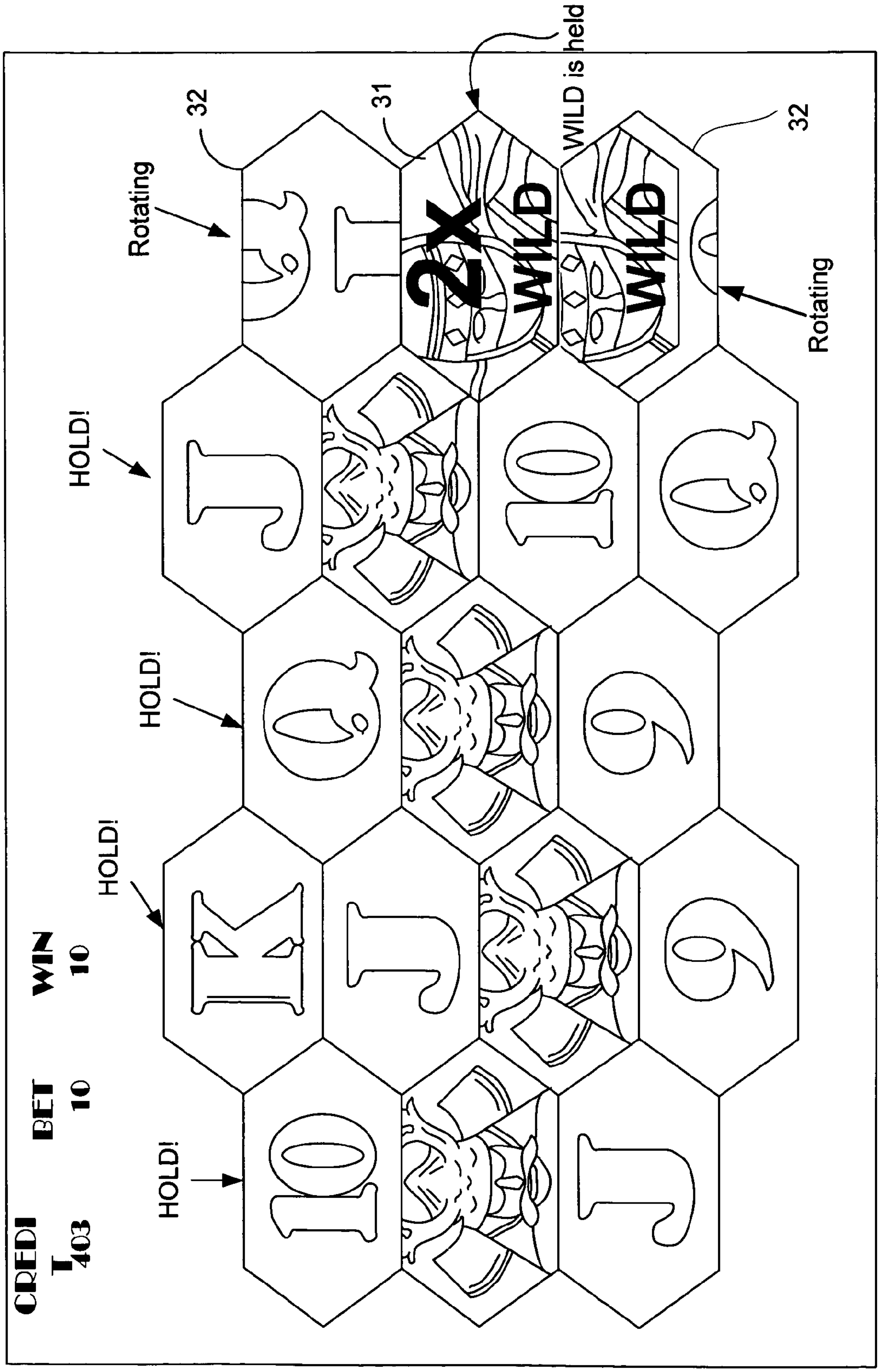
FIG. 11 is a diagram illustrating a state where a game situation shown in FIG. 10 is progressed further.

FIG. 11 is a diagram illustrating a state where the game situation shown in FIG. 10 has progressed further. FIG. 11 illustrates a state where the "multiply" of the wild symbol 31 has increased because a wild symbol passed beneath the held wild symbol 31. As shown in FIG. 11, the reel lines from the first column to the fourth column from the left are fixed, and only the reel of the fifth row continues to rotate. A setting is made to increase the "multiply" of the wild symbol 31 each time the wild symbol passes beneath the wild symbol 31.

Figure 12:
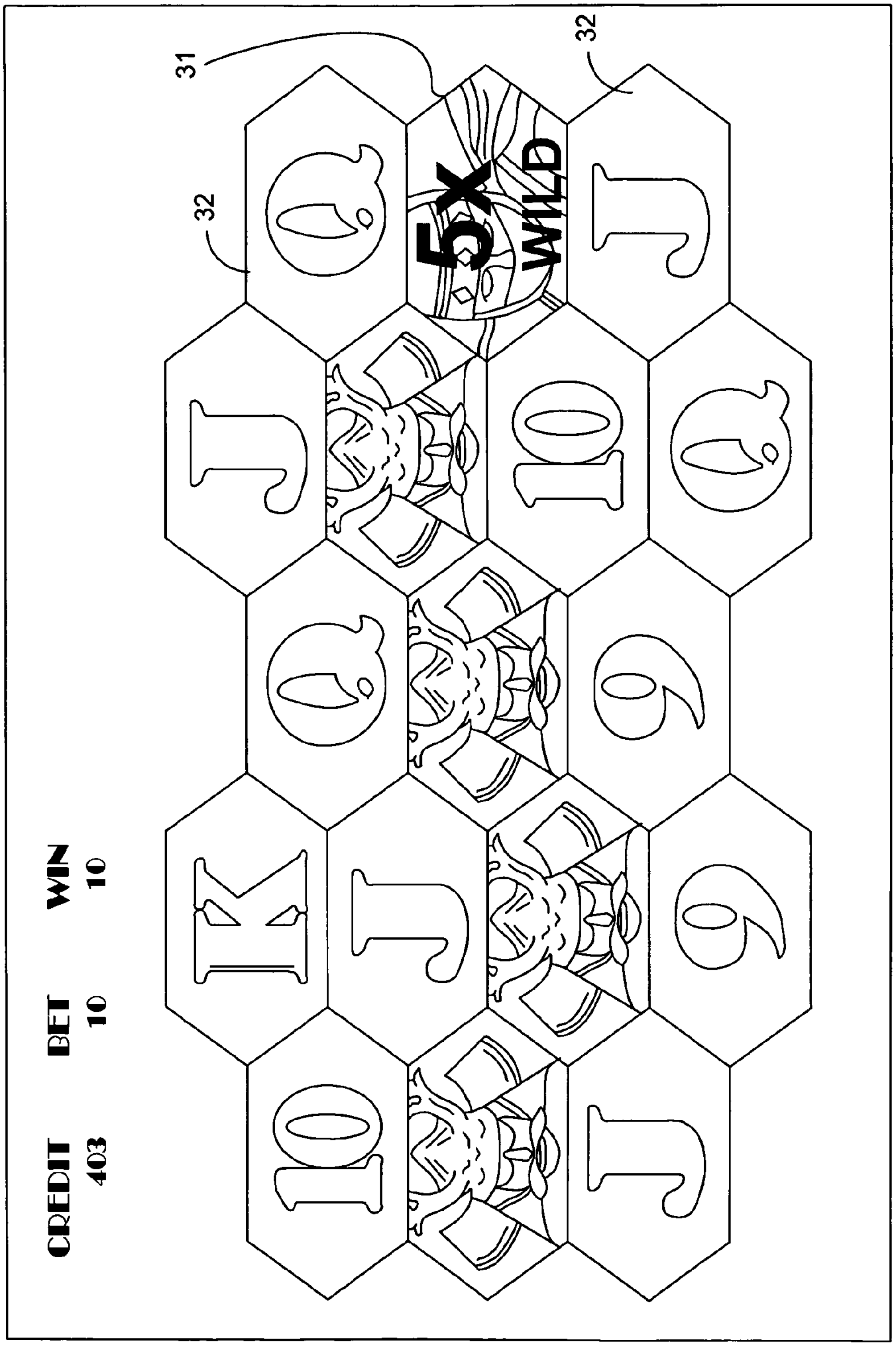
FIG. 12 is a diagram illustrating a state where a game situation shown in FIG. 11 is progressed further.

FIG. 12 is a diagram illustrating a state where a game situation shown in FIG. 11 has progressed further. FIG. 12 illustrates a state where the "multiply" of the wild symbol 31 ultimately changes to "X 5" because the wild symbol passed beneath the wild symbol 31 for the total of five times. In FIG. 12, the reel on the fifth column from the left is also in the stopped state. The cell 32 is showing a predetermined symbol. Finally, a determination for the number of free spin or a determination of the payout amount is made according to the "multiply" on the substantially-stationary symbol 31, which is determined by the operations in FIGS. 8 to 12.

Figure 13:
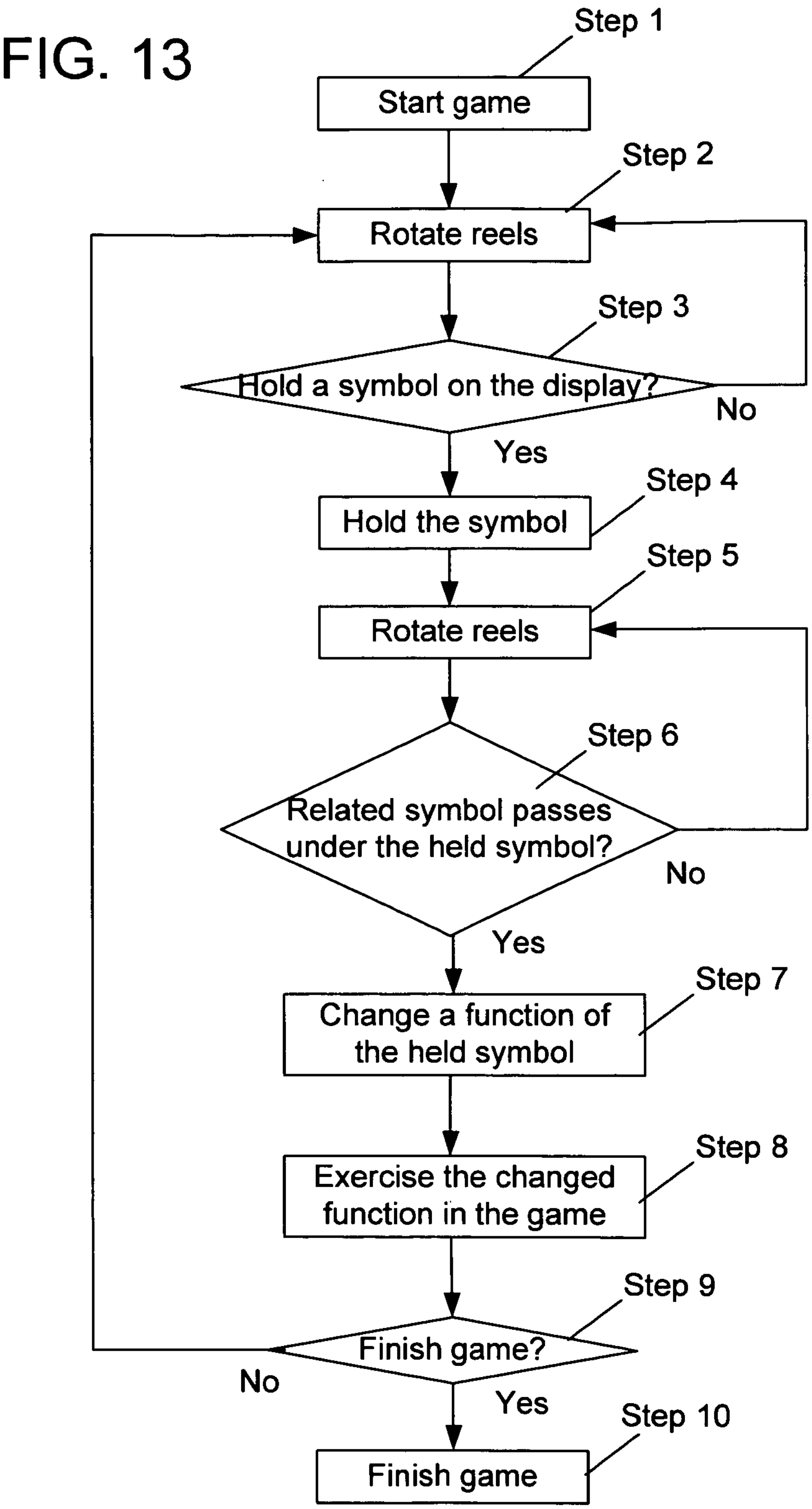
FIG. 13 is a flowchart illustrating an example of a basic operation of a gaming machine pertaining to the present invention to perform a game.

Next, an operation for the gaming machine pertaining to the present invention to execute the above-mentioned game will be concretely explained using a flow chart. FIG. 13 illustrates a basic operation of the gaming machine pertaining to the present invention, which executes the game described above. In the present invention, first, the controller starts a game and rotates the reel (steps 1 and 2). After executing a slot game for a predetermined time etc., the controller determines whether a substantially-stationary symbol is held on the reel display or not according to some sort of trigger (step 3). When the controller determines not to hold the substantially-stationary symbol on the reel display, the controller continues to execute the slot game without holding the substantially-stationary symbol on the reel display (step 2). When the controller determines to hold the substantially-stationary symbol on the reel display, the substantially-stationary symbol is held on the reel display (step 4).

After holding the substantially-stationary symbol on the reel display, the controller rotates a plurality of symbols along the reel line (step 5). While the controller rotates the plurality of symbols in step 5, the evaluator determines whether a predetermined related symbol is passing by the substantially-stationary symbols or not (step 6). When the evaluator does not recognize an existence of the related symbol, the controller continues the slot game (step 5). When the evaluator recognizes the existence of the related symbol, the processor changes a function of the substantially-stationary symbol (step 7). After a predetermined time elapses, the processor exercises the function according to some sort of trigger (step 8). In addition, the function does not need to be exercised immediately after the function changes, and, for example, the function may be exercised after the function of the substantially-stationary symbol is changed once and the function of the substantially-stationary symbol is further changed for a number of times. In such a case, the operations in steps 6 and 7 are repeated.

Finally, the controller determines whether the entire slot game is finished or not (step 9). When the entire game is determined to be finished, the entire game is finished (step 10). When the entire game is not determined to be finished, the game continues without finishing the slot game (step 2).

Figure 14:
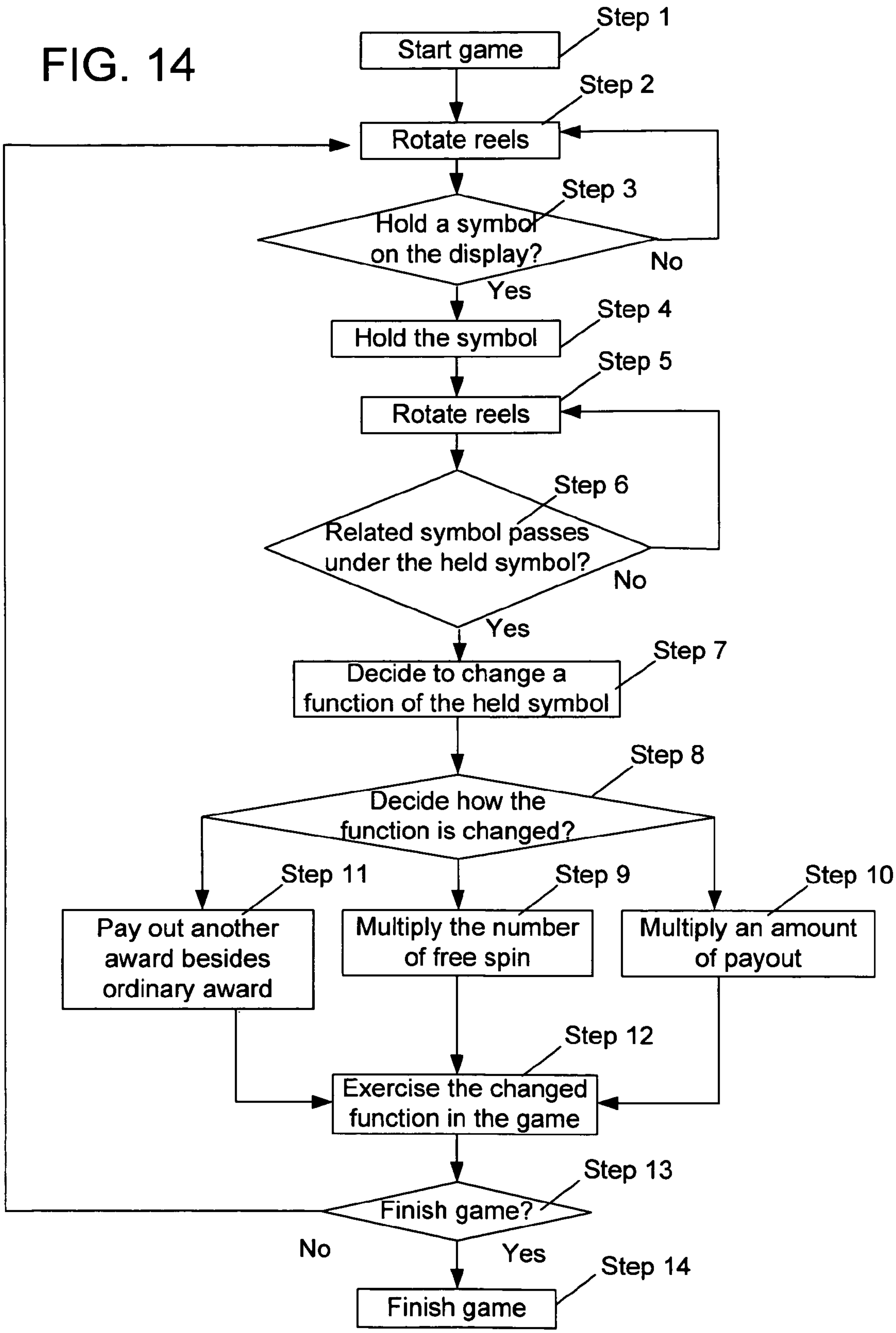
FIG. 14 is a flowchart illustrating an example of a basic operation of a gaming machine pertaining to the present invention to perform a game.

Next, FIG. 14 in which the operation executed by the gaming machine described in FIG. 13 will be explained in detail. Steps 1 to 6 and 12 to 14 in FIG. 14 are the same as those explained in FIG. 13. Here, a means for changing the function of the substantially-stationary symbol is explained. In the case when the evaluator recognizes the passing of the related symbol in step 6, the processor determines to change the function of the substantially-stationary symbol (step 7). The processor determines how the function is changed (step 8). When the processor gives the substantially-stationary symbol an ability to increase the number of free spin, (step 9), the function is exercised in the game (step 12). Meanwhile, when the processor gives the substantially-stationary symbol an ability to increase an amount of payout (step 10), the function is exercised in the game (step 12). Further, when the processor gives the substantially-stationary symbol an ability to pay out another award besides an ordinary amount (step 11), the function is exercised in the game (step 12).

In addition, the function exercised does not need to be limited to one type and a plurality of types of functions may be exercised at once. For example, two functions, such as the increase of the number of free spin and the increase of the amount of payout, may be given to the substantially-stationary symbol together, and those functions may be exercised together. As described above, the types of the function are not limited to these three, and the number of choice for the processor may be set to any number.

As mentioned above, although the present invention has been described concretely, the present invention is not limited to the above embodiments and various changes and modifications may be made without departing from the scope of the invention. For example, the change or exercise of the function of the substantially-stationary symbol is not limited during the secondary game (bonus game, or free spin game etc.), and may be in a primary game, or in other stages.

What is claimed is:

1. A gaming machine, comprising:

a reel having a plurality of indicia and being rotatable along an axis;

a display configured to display a portion of the reel;

a user input device configured to generate a signal indicative of input by a player initiating a single spin of a game; and, a controller coupled to the display device and the user input device and being configured to begin the game and start rotating the reel in response to receiving the signal from the user input device;

wherein during the single spin of the game, the controller:

(i) detects a triggering condition as the reel is spinning and responsively holds one of the indicia on the display while the reel continues spinning, (ii) accumulates a number of times a predetermined one of the plurality of indicia on the spinning reel passes the held indicia while the reel continues spinning, (iii) stops rotating the reel, and (iv) detects a winning condition and responsively provides a prize to the player, the prize being a function of the winning condition and the accumulated number.

2. A gaming machine of claim 1, wherein the controller lowers a rotating rate of the reel.

3. A gaming machine of claim 1, wherein the controller randomly shows each of the plurality of indicia on the display.

4. A gaming machine of claim 1, wherein the controller shows each of the plurality of indicia on the display while the reel is rotating.

5. A gaming machine of claim 1, wherein the controller shows each of the plurality of indicia on the display when a winning combination which includes each of the plurality of indicia is arranged.

6. A gaming machine of claim 1, wherein the controller shows each of the plurality of indicia, which has passed on the display.

7. A gaming machine of claim 1, wherein the controller continuously shows the predetermined one of the plurality of indicia used in a previous game on the display.

8. A gaming machine of claim 1, wherein the reel is virtual.

9. A gaming machine, as set forth in claim 1, wherein the prize includes an ordinary award and a bonus award, the bonus award being a function of the accumulated number.

10. A gaming machine, as set forth in claim 1, wherein the prize includes a number of free plays, the number of free plays being a function of the accumulated number.

11. A gaming machine, as set forth in claim 1, wherein the prize is determined as a function of a payout amount and a multiplier, the multiplier being a function of the accumulated number.

12. A gaming machine, as set forth in claim 1, wherein the predetermined one of the plurality of indicia is the same as the held indicia.

13. A gaming machine, as set forth in claim 1, wherein the predetermined one of the plurality of indicia is related to the held indicia.

14. A gaming machine of claim 1, wherein an outcome of the game is modified to include a number of wild indicia, the number of wild indicia being a function of the accumulated number.

15. A method of implementing a game, comprising the steps of:

starting the game in response to input by a user initiating a single spin of the game;

rotating a reel, the reel having a plurality of symbols, wherein at least a portion of the reel is visible on a display;

wherein during the single spin of the game, a controller:

(i) detects a triggering condition as the reel is spinning and responsively holds one of the symbols on the display while the reel continues spinning;

(ii) accumulates a number of times a predetermined one of the plurality of symbols on the spinning reel passes the held symbol while the reel continues spinning; and, (iii) stops rotating the reel, (iv) detects a winning condition and responsively provides a prize to the player, the prize being a function of the winning condition and the accumulated number.

16. A method of claim 15, wherein the predetermined one of the plurality symbols is the same as the held symbol.

17. A method of claim 15, further comprising:

outputting a combination sound when the predetermined one of the plurality of symbols on the reel passes the held symbol while the reel is spinning.

18. A method, as set forth in claim 15, wherein the reel is virtual.

19. A method, as set forth in claim 15, wherein the prize includes an ordinary award and a bonus award, the bonus award being a function of the accumulated number.

20. A method, as set forth in claim 15, wherein the prize includes a number of free plays, the number of free plays being a function of the accumulated number.

21. A method, as set forth in claim 15, wherein the prize is determined as a function of a payout amount and a multiplier, the multiplier being a function of the accumulated number.

22. A method, as set forth in claim 15, wherein the predetermined one of the plurality of symbols is related to the held symbol.

23. A method of claim 15, further comprising modifying an outcome of the game to include a number of wild indicia, the number of wild indicia being a function of the accumulated number.

24. A non-transitory computer usable medium having a computer readable program embodied therein, the program causing a computer to function as:

a reel having a plurality of indicia and being rotatable along an axis;

a display configured to display a portion of the reel;

a user input device configured to generate a signal indicative of input by a player initiating a single spin of a game; and, a controller coupled to the display device and the user input device and being configured to begin the game and start rotating the reel in response to receiving the signal from the user input device;

wherein during the single spin of the game, the controller:

(i) detects a triggering condition as the reel is spinning and responsively holds one of the indicia on the display while the reel continues spinning, (ii) accumulates a number of times a predetermined one of the plurality of indicia on the spinning reel passes the held indicia while the reel continues spinning, (iii) stops rotating the reel, and (iv) detects a winning condition and responsively provides a prize to the player, the prize being a function of the winning condition and the accumulated number.

25. A non-transitory computer usable medium, as set forth in claim 24, wherein the prize includes an ordinary award and a bonus award, the bonus award being a function of the accumulated number.

26. A non-transitory computer usable medium, as set forth in claim 24, wherein the prize includes a number of free plays, the number of free plays being a function of the accumulated number.

27. A non-transitory computer usable medium, as set forth in claim 24, wherein the prize is determined as a function of a payout amount and a multiplier, the multiplier being a function of the accumulated number.

28. A non-transitory computer usable medium, as set forth in claim 24, wherein an outcome of the game is modified to include a number of wild indicia, the number of wild indicia being a function of the accumulated number.

29. A gaming machine to allow a player to play a game, comprising:

a plurality of reels, each reel having a plurality of indicia and being rotatable along an axis;

a display configured to display a portion of each reel;

a user input device configured to generate a signal indicative of input by a player; and, a controller coupled to the display device and the user input device and being configured to start rotating the reel in response to receiving the signal from the user input device, to detect a triggering condition and responsively hold one of the indicia on the display while the reels continue spinning, to accumulate a number of times a predetermined one of the plurality of indicia on one of the spinning reels passes the held indicia while the one of the spinning reels is spinning, and to stop the rotation of the reels, detect a winning condition in an outcome of the game and responsively provide a prize to the player, wherein the outcome of the game is modified to include a number of wild indicia, the number of wild indicia being a function of the accumulated number.

30. A gaming machine, as set forth in claim 29, wherein an initial outcome of the game has an initial number of wild indicia and the modified outcome of the game has a modified number of wild indicia as a function of the accumulated number.

31. A gaming machine, as set forth in claim 30, wherein the modified number of wild indicia is determined by multiplying the initial number by the accumulated number.

32. A method of implementing a game, including the steps of:

initiating the game in response to input by a user;

rotating a plurality of reels, each reel having a plurality of indicia and being rotatable along an axis;

displaying a portion of each reel on a display;

detecting a triggering condition and responsively holding one of the indicia on the display while the reels continues spinning;

accumulating a number of times a predetermined one of the plurality of indicia on one of the spinning reels passes the held indicia while the one of the spinning reels is spinning; and, stopping the rotation of the reels, detecting a winning condition in an outcome of the game and responsively providing a prize to the player, wherein the outcome of the game is modified to include a number of wild indicia, the number of wild indicia being a function of the accumulated number.

33. A method, as set forth in claim 32, wherein an initial outcome of the game has an initial number of wild indicia and the modified outcome of the game has a modified number of wild indicia as a function of the accumulated number.

34. A method, as set forth in claim 33, wherein the modified number of wild indicia is determined by multiplying the initial number by the accumulated number.

35. A non-transitory computer readable medium recording a program, the program causing a computer to function as:

a plurality of reels, each reel having a plurality of indicia and being rotatable along an axis;

a display configured to display a portion of each reel;

a user input device configured to generate a signal indicative of input by a player; and, a controller coupled to the display device and the user input device and being configured to start rotating the reel in response to receiving the signal from the user input device, to detect a triggering condition and responsively hold one of the indicia on the display while the reels continue spinning, to accumulate a number of times a predetermined one of the plurality of indicia on one of the spinning reels passes the held indicia while the one of the spinning reels is spinning, and to stop the rotation of the reels, detect a winning condition in an outcome of the game and responsively provide a prize to the player, wherein the outcome of the game is modified to include a number of wild indicia, the number of wild indicia being a function of the accumulated number.

* * * * *